Figure 1:
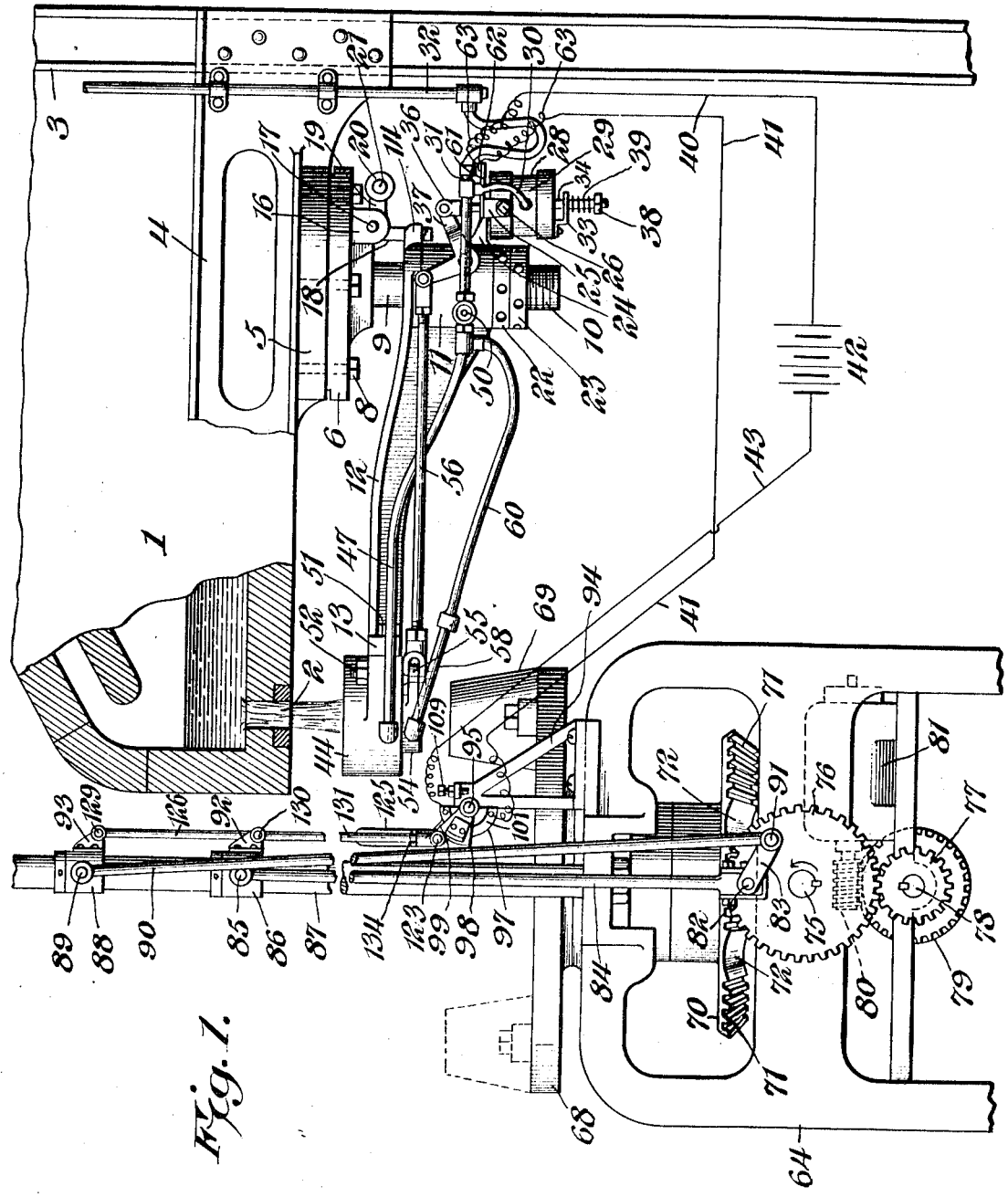

I. H. FREESE.
SHEAR AND INTERRUPTING DEVICE FOR CONTINUOUS FLOW GLASS TANKS.
APPLICATION FILED NOV. 2, 1910.

1,020,409.

Patented Mar. 19, 1912.

4 SHEETS—SHEET 1.

WITNESSES
Howard F. Orr.
F. J. Chapman

I. H. Freese, INVENTOR,
BY E. G. Siggers
ATTORNEY

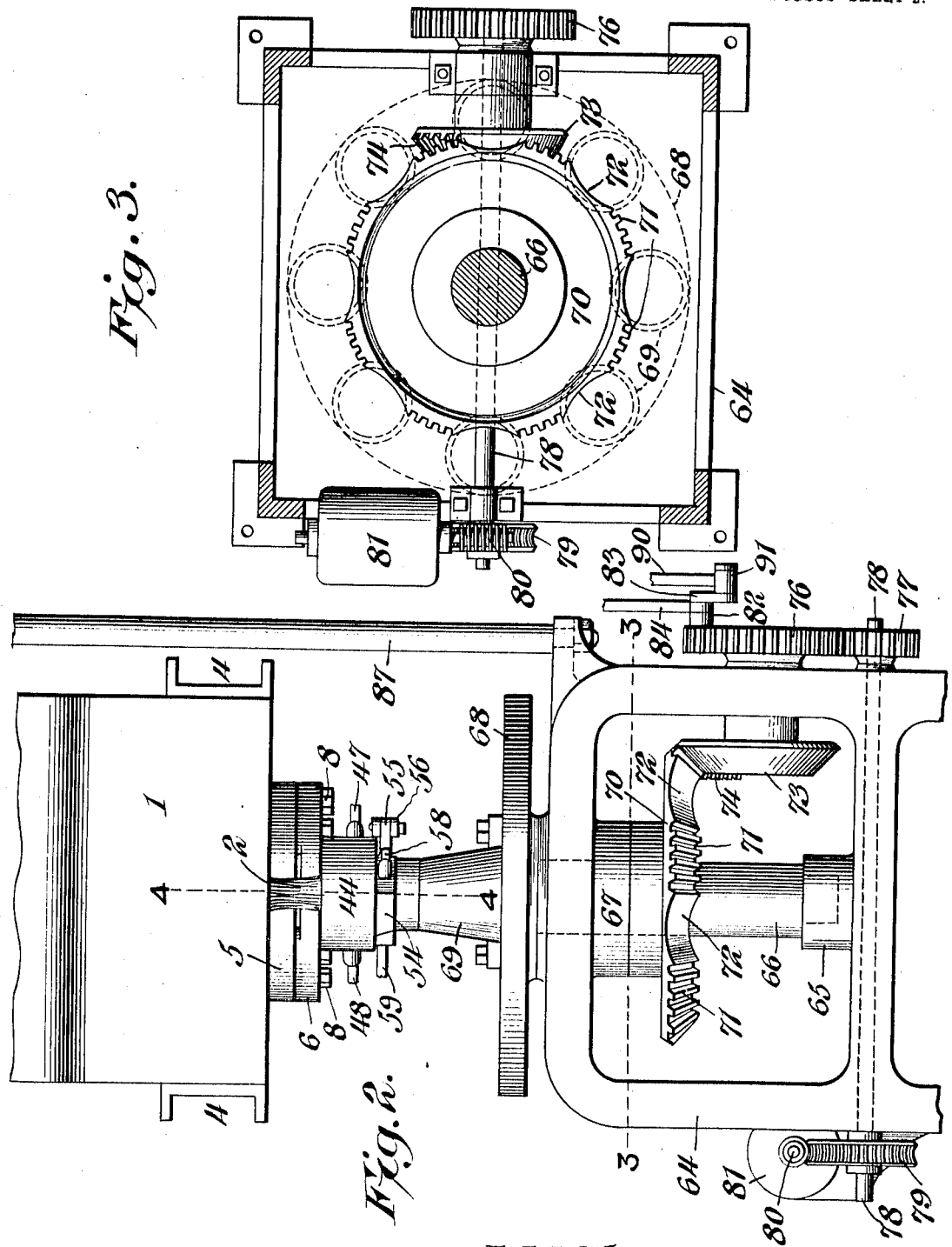

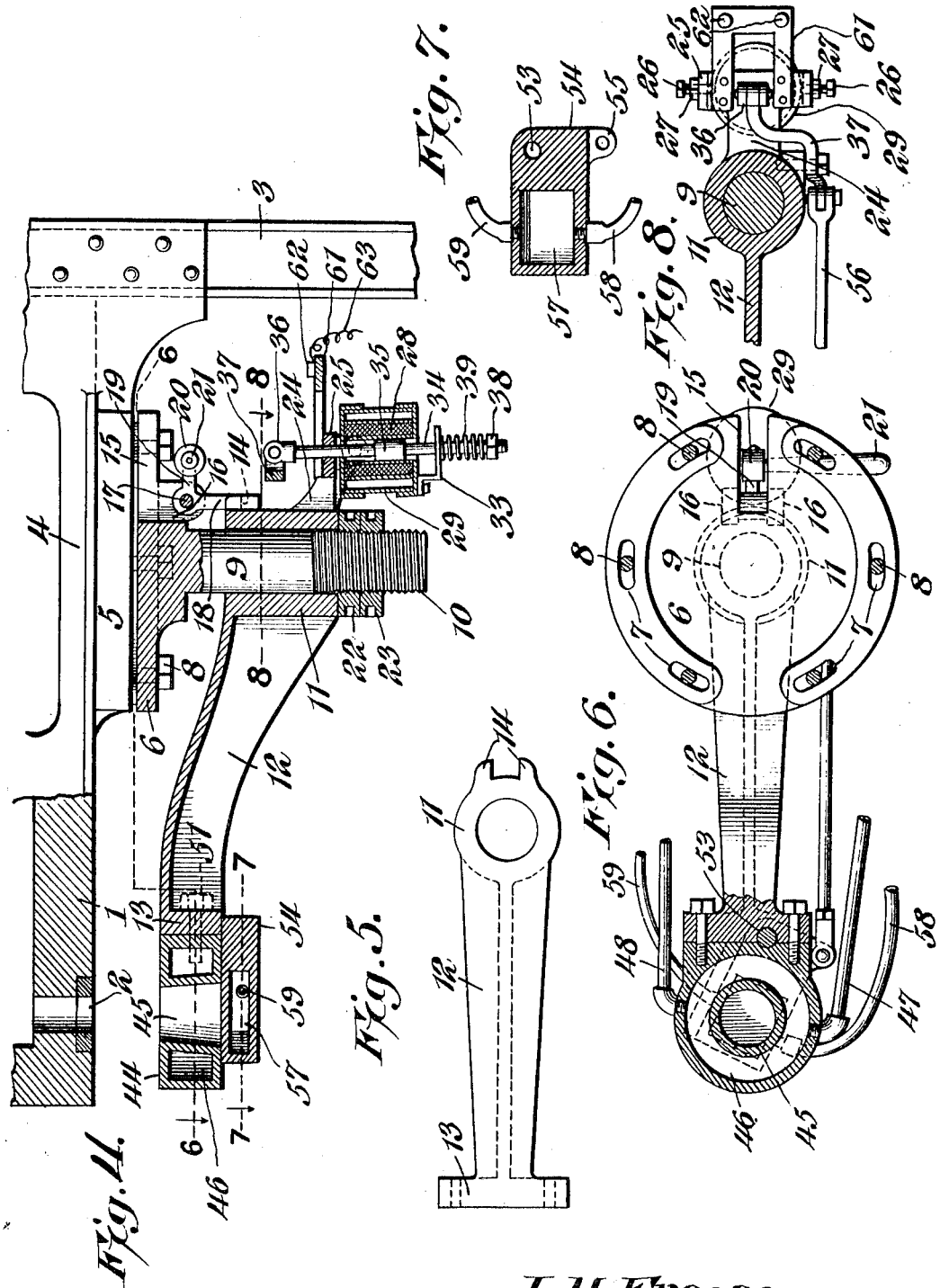

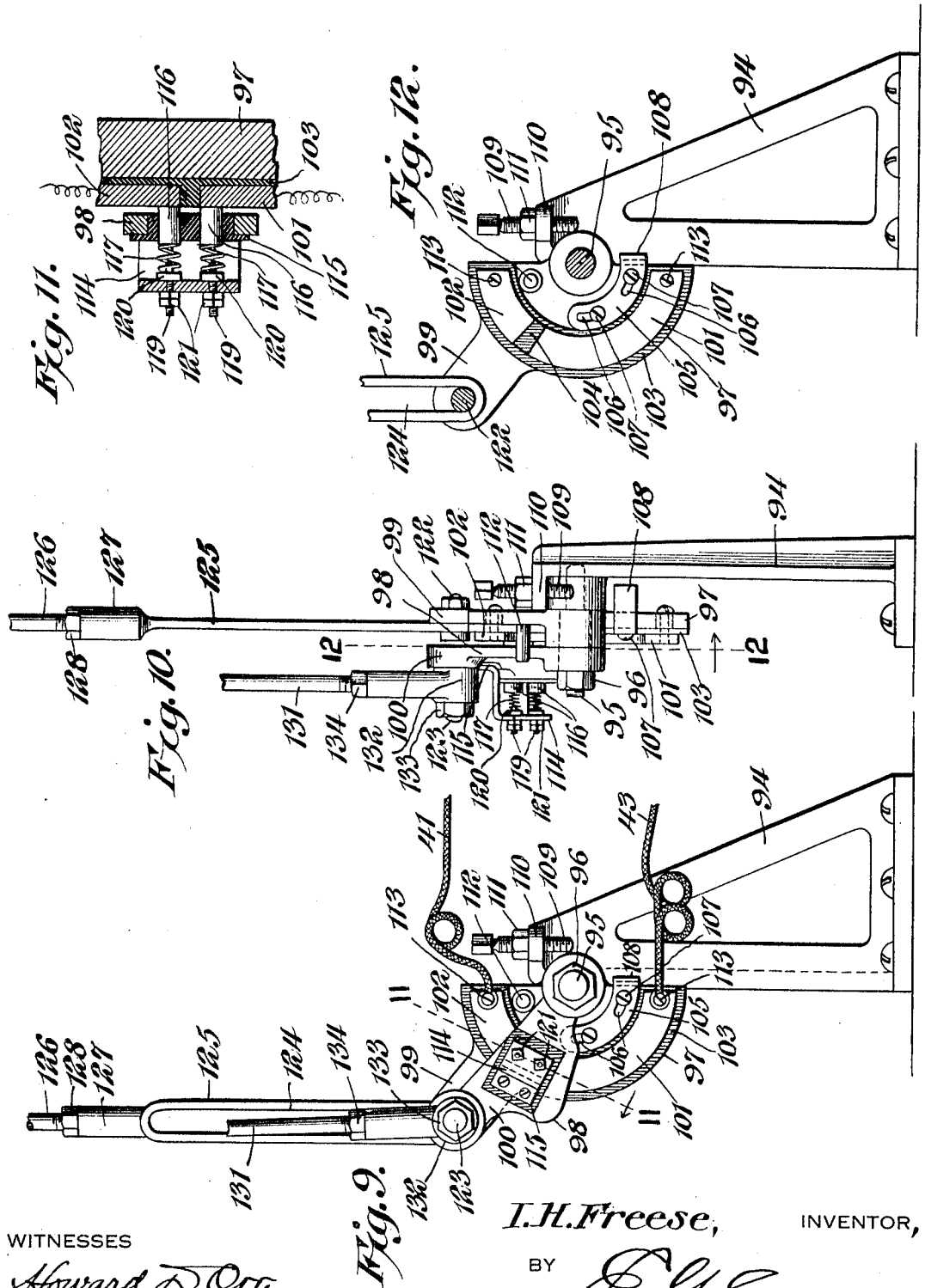

UNITED STATES PATENT OFFICE.

IRA HAZLETT FREESE, OF CLARKSBURG, WEST VIRGINIA.

SHEAR AND INTERRUPTING DEVICE FOR CONTINUOUS-FLOW GLASS-TANKS.

1,020,409.   Specification of Letters Patent.   Patented Mar. 19, 1912.

Application filed November 2, 1910. Serial No. 590,400.

*To all whom it may concern:*

Be it known that I, IRA H. FREESE, a citizen of the United States, residing at Clarksburg, in the county of Harrison and State of West Virginia, have invented a new and useful Shear and Interrupting Device for Continuous-Flow Glass-Tanks, of which the following is a specification.

This invention has reference to improvements in shear and interrupting devices for continuous flow glass tanks, and its object is to provide means for causing the deposition of charges of glass in molds without interrupting the flow of glass from the tank and without the likelihood of stoppage of the apparatus by the chilling of glass on moving parts.

In accordance with the present invention the glass as it comes from the tank is received into a funnel controlled by a gate and electro-mechanical means are employed for the actuation of the gate in timed relation to the movements of the mold carrier, so that a charge accumulates in the funnel with the gate shut during the transitional movement of the mold carrier, and while the apparatus is acting on the glass in a mold already charged, the movement of the mechanisms so acting on the glass in the charged mold causes the rupture of an electric circuit for a sufficient time to bring about the movement of the gate to the open position, thus permitting the accumulated glass in the funnel to flow into the mold, and the parts are so timed in action that the flow of glass to the mold is cut off by the gate when the proper charge has been deposited in the mold, and then the carrier is turned to bring an uncharged mold into position to be charged, while the freshly charged mold is brought into position for the operation of the mechanisms designed to act on the glass in the mold, the glass from the tank in the meantime flowing continuously into the funnel. Because of the high temperature of the molten glass, the parts through which the glass flows on its way to the molds would become highly heated, but provision is made for sufficiently chilling the parts engaged by the glass to prevent the attainment of an undesirable temperature.

The invention will be best understood from a consideration of the following detailed description taken in connection with the accompanying drawings forming a part of this specification, with the understanding, however, that while the drawings illustrate a commercially operative structure, the invention is susceptible of various modifications and changes to suit varying conditions without, however, involving the departure from the invention.

In the drawings:—Figure 1 is an elevation with parts broken away and some parts diagrammatically illustrated, of an apparatus embodying the present invention. Fig. 2 is an elevation of the structure of Fig. 1 as viewed from the left hand end of Fig. 1, with some parts broken away and omitted. Fig. 3 is a section on the line 3—3 of Fig. 2 showing the mold table in dotted lines. Fig. 4 is a section on the line 4—4 of Fig. 2 with the mold table omitted. Fig. 5 is a plan view of the carrying arm for the funnel. Fig. 6 is a section on the line 6—6 of Fig. 4. Fig. 7 is a section on the line 7—7 of Fig. 4. Fig. 8 is a section on the line 8—8 of Fig. 4. Fig. 9 is an elevation of an electric controller used in connection with the structure, the scale being larger than that of Fig. 1. Fig. 10 is an elevation of the structure of Fig. 9 from the right hand side thereof. Fig. 11 is a section on the line 11—11 of Fig. 9 but in part diagrammatic. Fig. 12 is a section on the line 12—12 of Fig. 10.

Referring to the drawings, there is shown a nose 1 of a glass tank, but since the tank in itself has no part in the present invention no specific description thereof is deemed necessary. The nose 1 is provided with a flow hole 2. Of the supports for the glass tank, members 3 and 4 are shown, other parts being omitted as unnecessary to an understanding of the present invention. The frame members are provided at an appropriate point with a plate or boss 5. The boss 5 is designed for the support of a casting 6 shown as of circular outline and provided near its periphery with a circular series of curved slots 7 for the passage of headed screws 8 entering appropriately tapped holes in the boss 5. The curvature of the slots 7 is concentric with the center of the casting 6 and consequently this casting may be shifted about its axis to accommodate the flow hole 2. Formed on the casting 6 and extending in the direction of the axis thereof is a stem 9 threaded at the free end for an appropriate distance, as shown at 10, the stem 9 being cylindrical. Mounted on the stem 9 by an elongated hub 11 is an arm 12 formed at its free end with a head 13, and on the side of the hub 11 remote from the arm 12 there are formed spaced ears 14. The casting 6 is provided at one point with a radial recess 15 opening at the periphery of the casting and near the closed end of the recess the casting is formed with matching ears 16, which ears carry a pin 17 on which is mounted an arm 18 designed to engage between the lugs 14 to lock the arm 12 in a definite position, which position is in proper relation to the opening 2. In one piece with the arm 18 is another arm 19 at approximately right angles thereto, and this arm at its outer end carries a weight 20 tending at all times to hold the arm 18 in position between the lugs 14, but yielding to a superior force when it is desirable to move the arm 18 from between the lugs 14. For this purpose a suitable handle 21 is provided, and this handle may be carried by the weighted end of the angle arm 19. By this means while the arm 12 is normally held in locked position, it may be readily unlocked and swung about the axis of the stem 9 in either direction. The arm 12 is held to the stem 9 by nuts 22, 23, shown as capstan nuts, but, of course, any other type of nut will answer. The nut 22 serves as an adjusting and bearing nut for the hub 11, while the nut 23 serves as a lock nut holding the nut 22 in position after being once adjusted. The hub 11 is also provided with a bracket 24 carrying a yoke 25 with matching ends, through which project pivot screws 26 provided with lock nuts 27, the points of these pivot screws being in the same line and one toward the other. These screws 26 are designed for the support of a solenoid 28 shown as provided with a casing 29 in spaced relation to the outer surface of the solenoid, and it is with this casing that the screws 26 engage near the upper end thereof, the solenoid being therefore capable of a rocking motion, being in part pendently supported by the screws 26. The chamber formed between the outer casing 29 and the outer wall of the solenoid 28 is made water tight, and water may be led thereto through a pipe 30 connected to another pipe 31 in turn connected to a pipe 32 coming from a suitable source of supply of a cooling fluid which is preferably, though not necessarily water. The source of supply is, however, not shown.

The casing 29 carries a bracket 33 on its under side and this bracket extends across the axis of the solenoid 28 and is there pierced for the passage of a rod 34 which within the solenoid carries a core 35, and also projects through the other end of the solenoid and through the yoke 25, being guided by the latter, and terminates in an eye 36 made fast to one arm of a bell crank lever 37 pivotally secured to the hub 11. The end of the rod 34 extending beyond the bracket 33 is threaded for the reception of a nut 38 confining a spring 39 on said rod between the nut and the bracket 33, this spring tending to move the rod in the direction to carry the core 35 toward the bracket 33, and at the same time rocking the lever 37 in an appropriate direction. The tension of the spring 39 is readily adjusted by means of the nut 38.

The terminals of the solenoid 28 are coupled to respective conductors 40, 41, one of which, say the conductor 40, is coupled to one side of a battery 42 or other suitable source of electric current. The other side of the battery 42 is connected to a conductor 43 and the conductors 41 and 43 lead to circuit controlling mechanisms to be hereinafter described.

Secured to the head 13 of the arm 12 is a funnel 44 having therethrough a passage 45 expanding toward the lower end and formed in the funnel structure about the passage 45 is a chamber 46 having an inlet conduit or pipe 47 and an outlet pipe 48, the inlet pipe 47 being connected to the pipe 31, and in this pipe 31 there may be provided a controlling valve 50. The pipe 48 leads to any suitable point of disposal of a cooling fluid directed by the pipe 47 into the chamber 46 for circulation thereabout. The funnel 44 is held to the arm 12 by suitable bolts 51 and carried by the head 13 is a pivot screw 52 extending through a perforation 53 in one corner of a substantially rectangular gate 54 having at the opposite corner of the same end of the gate an ear 55 to which is attached one end of a link 56 coming from the arm of the bell crank lever 37 remote from that connected to the armature rod 39. The gate 54 is formed with an interior chamber 57, to which are connected inlet and outlet pipes 58 and 59, respectively, the inlet pipe being coupled to the pipe 31 through a flexible section 60, and the outlet pipe leading to some suitable point of disposal of the cooling fluid after passing through the gate. The puropse of the gate 54 is to close the lower end of the passage 45 of the funnel 44, and the parts are so positioned that the opening 45 is set underneath the flow hole 2. The gate is moved to the closed position by the energization of the solenoid 28, thus causing its core 35 to move against the action of the spring 39, compressing the latter. When the solenoid is deënergized, then the spring 39 will act to move the gate 54 away from the passage 45 to unclose the lower end thereof, the movement of the gate being transverse to the longitudinal axis of the passage 45. Considering glass as flowing continuously through the hole 2, it will accumulate in the passage 45 of the funnel, so long as the gate 54 is in the closed position, and when the gate is moved out of closing relation to the passage 45, the glass will then gravitate therefrom, but when the gate is returned to its closed position the outflowing glass is sheared off and the oncoming glass will again accumulate within the funnel to flow out therefrom on the next opening of the gate. As will hereinafter appear, the operation of the parts is so timed that the funnel passage 45 will not become full enough to overflow, and there is no opportunity for the glass to accumulate at any point and chill to thereby clog the parts and stop their operation. At the same time, the flow of cooling fluid through the chambers 46 and 57 will maintain the funnel structure and the gate at a sufficiently low temperature to prevent these parts from overheating from contact with the molten glass.

It will be observed that the solenoid 28 is mounted on pivot supports so as to rock in agreement with the movement of the bell crank lever. Since it is not desirable that the conductors 40 and 41 participate in this rocking movement, there are made fast to the yoke 25 arms 61, each carrying a binding post 62 for the reception of the terminals of the respective conductors 40 and 41, and from these binding posts flexible conductors 63, continuing the conductors 40 and 41, lead to the terminals of the solenoid 28.

It is desirable that the device acting on the glass within the molds and also the mold supporting means be closely adjacent to the glass tank, and for this purpose there is provided a suitable supporting frame 64 carrying a step bearing 65 in which is mounted an upright shaft 66 passing through a bearing 67 at the upper end of the frame 64, and at its upper end carrying a table 68 upon which is mounted a circular series of molds, of which latter a single mold 69 is shown in full lines for convenience of illustration. In Figs. 1 and 3 other molds are shown in dotted lines, Fig. 3 indicating an entire circular series thereof on the table 68. The molds 69 are so disposed that they may be brought one at a time in order immediately beneath and closely adjacent to the under surface of the gate 54, so that glass released from the funnel 44 will gravitate into a mold then in place, the amount of glass received into the funnel and ultimately deposited in the mold being readily regulated by a suitable adjustment of the several parts. By providing a circular series of molds, the action of the machine as a whole may be comparatively rapid.

The shaft 66 carries a gear wheel 70 of the mutilated type, having sections 71 of gear teeth separated by blank sections 72 of concaved contour, the gear wheel 70 being of the beveled type, and this gear wheel is driven by a beveled pinion 73 of the mutilated type having at one point in its surface beveled gear teeth 74 agreeable in number to the number of teeth in any one section 72, while the plain portion of the bevel pinion 73 will enter the concavities 72, thus holding the gear wheel 70 against rotation, except when the teeth 74 are in mesh with the teeth 71. The pinion 73 is mounted on one end of a short shaft 75 journaled in the frame 64, and at the other end of this shaft there is secured thereto a gear wheel 76 in mesh with a pinion 77 on one end of a shaft 78 journaled in the frame 64, and at the other end carrying a worm gear 79 driven by a worm 80 on the armature shaft of an electric motor 81, but it will be understood that this electric motor may be taken as typical of any other means of driving the pinion 73. The shaft 78 may be assumed as rotating continuously, and the pinion 73 will, therefore, be rotated continuously but the gear 70 with the table 68 will be given rotative movement intermittently with periods of rest agreeable to the relation between the teeth 74 and the plain portion of the periphery of the pinion 73, the said pinion locking the gear 70, and, therefore, the table 68 in the position of rest. It results, therefore, that each mold will be moved into position to receive a charge of glass, and will be there held long enough for the purpose, and after the predetermined period of rest will be moved rapidly away from the receiving point toward the point where the deposited glass is further treated, while the next mold in order is receiving its charge of molten glass. The periods of rest are also of sufficient extent to permit the action of the glass molding devices.

Mounted on the gear wheel 76 near the periphery thereof is a wrist pin 82, to the outer end of which is secured one end of an arm 83 so as to at all times hold the position of the wrist pin to which it is adjusted. The wrist pin 82 carries one end of a pitman 84, the other end of which is connected to another wrist pin 85 on a sleeve 86 slidable along a post 87 erected on the frame 64, and this sleeve 86 is designed to carry the usual plunger for coöperating with the molds 69 when brought into proper relation thereto. The molding side of the machine does not in itself enter into the present invention, and being common and well known needs neither illustration or description herein. Also mounted on the post 87 is another slidable collar 88 having a wrist pin 89 to which is connected one end of a pitman 90, the other end of which is mounted on a wrist pin 91 on the free end of the arm 83. The collar 86 is provided on one side with an ear 92 and the collar 88 is provided on one side with a like ear 93.

Mounted on the frame 64 adjacent the post 87 is a bracket 94, which together with mechanism carried thereby is best shown in Figs. 9, 10, 11 and 12. This bracket carries near its upper end an outstanding stud 95 which may be threaded at the free end for the application of a nut 96. Mounted on this stud are the hubs of two segmental arms 97, 98 held to the stud by the nut 96, but free to move on the stud as a pivot support. The arm 97 is approximately semicircular in contour, while the arm 98 is less extensive. The arm 97 has extending therefrom radially a lug 99, and the arm 98 has a radially extending lug 100. Attached to the arm 97 are two curved plates 101 and 102 in concentric relation to the axis of movement of the arm, and at their meeting ends separated a short distance. These plates rest on insulating material 103, and said insulating material or similar material may fill the space between the contiguous ends of the plates, as indicated at 104, so that the exposed surfaces of the plates and of the insulating material between them may be flush one with the other. Any other means of forming and insulating the plates 101 and 102 which constitute contact members may be employed. Fast to the arm 97 between the stud 95 and the plate 101 is a curved strip 105 having curved slots 106 therethrough for the passage of screws 107 by means of which the plate 105 is secured adjustably to the arm 97. One end 108 of this plate is turned at an angle and extends beyond the arm 97 toward the bracket 94 so as to be in the path of a set screw 109 extending toward the tapped hole in an offset 110 in the bracket 94, and this set screw is provided with a lock nut 111. The screw 109 serves as a limiting member for the movement of the arm 97 in one direction, this set screw engaging the angle portion 108 of the strip 105, and since this strip may be adjusted because of the slots 106 the extent of movement of the arm 97 may be thereby regulated. The arm 97 is also provided with an outstanding pin 112 in position to engage a corresponding part of the arm 98 for a purpose which will hereinafter appear. The contact plates 101 and 102 are each provided with a binding screw 113 to receive the ends of the respective conductors 41 and 43. Carried by the arm 98 is an overhanging bracket 114, which, when the arm 98 is of conducting material, may be insulated therefrom by a plate 115 of suitable insulating material, and through this plate are passages for brushes 116 adapted to engage the contact plates 101 and 102. These brushes or contact blocks 116 are urged toward the contact plates by springs 117, each at one end engaging a respective block, and at the other end engaged by a rod 119 having a collar 120 thereon for holding the spring in place and urging it toward the block. Each rod 119 is threaded and extends through a threaded passage in the bracket 114 and nuts 121 on each rod serve to lock the rods in adjusted positions. By this means the tension of the springs 117 is readily adjusted, and wear of the blocks 116 compensated. The lug 99 carries a headed pin or bolt 122, and the lug 100 carries a wrist pin 123. The headed pin 122 extends through an elongated slot 124 in one end of a section 125 of a pitman 126, the section 125 being flat to readily engage behind the head of the pin 122 in sliding relation thereto, and at the end where connected with the body of the pitman the section 125 is provided with a socket 127, while the body of the pitman is threaded to the socket and held therein by a lock nut 128, thus permitting adjustment of the portion 125 with the pitman body 126. The other end of the pitman 126 is connected to a wrist pin 129 on the bracket 93. The bracket or ear 92 is also provided with a wrist pin 130 to which is connected one end of a pitman 131, and the other end of this pitman is provided with a socketed eye member 132 adapted to the wrist pin 123 to which it may be held by a nut 133. In order to determine the length of the pitman 131 it is threaded into the socket member 132, and held thereto by a lock nut 134.

Let it be assumed that glass is flowing through the opening 2 into the passage 45 of the nozzle 44 and that at the time under consideration the solenoid 28 is energized because the blocks or brushes 116 are at the time in engagement with the respective plates 101 and 102 on opposite sides of the separating insulation 104, the circuit then being completed from the battery 42 by way of the conductor 43 to the plate 102, thence to the block 116 in engagement with this plate, thence by the spring 117 to the bracket 114, thence to the other spring 117 by way of the respective brush 116 to the plate 101, thence by the conductor 41 to and through the solenoid, and by the conductor 40 back to the battery. Under these circumstances the core 35 is centralized or nearly so in the solenoid, and consequently the bell crank lever 37 is in a position holding the gate 54 closed and the spring 39 compressed. In the particular position assumed, the wrist pin 82 is in the uppermost position with the arm 83 trailing with respect thereto and consequently the wrist pin 91 has not reached its highest position. Further movement of the wrist pin 82 is toward the lower position, while the wrist pin 91 is still approaching the highest position. The result of this is that the arm 97 is moved still farther in a clockwise direction as viewed in Figs. 9 and 12, while the arm 98 begins a counter-clockwise movement. The result of this combined movement is a rapid shift of the brush or block 116 on the contact plate 102 from the latter to the insulation 104, and to the plate 101, thus cutting the plate 102 out of circuit and consequently breaking the circuit. This results in the deënergization of the solenoid 28, so that the spring 39 is no longer held against its normal tendency, but is released thereto and the gate 54 is moved to the open position uncovering the lower end of the passage 45. At this time there is a mold 69 underriding the passage 45 so that the glass already accumulated within the passage gravitates into the mold and the stream of glass coming through the opening 2 also gravitates into the mold. The downward or clockwise movement of the arm 98 continues until the wrist pin 82 reaches the lowermost position, the plunger actuated by the collar 86 participating in such movement, and entering the charged mold already in its path, and as soon as the wrist pin 91 reaches the highest point it too begins its travel toward the lowermost position and the arm 98 begins to travel in a counter-clockwise direction about the pin 95, but this movement is caused by gravity due to the tendency of the pitman section 125 to move away from the pin 122. The counter-clockwise movement of the arm 97 continues until the stop plate 105 engages the stop screw 109 by the bend 108, and this stoppage of the arm 98 occurs before the pitman 126 has moved to the lowermost position, the continued movement of the pitman being permitted by the slot 124, the pin 122 being then at rest. As soon as the wrist pin 82 reaches its lowermost position it begins to rise and through the pitman 84 the collar 86 participates in such movement and by means of the pitman 131 the arm 98 is caused to again move in a clockwise direction carrying the brushes 116 over the plate 101 until ultimately the pin 112 is engaged by the arm 98 as the brushes 116 are brought into engagement with both plates 101 and 102 simultaneously, thus again energizing the solenoid 28 and causing the closure of the gate 54 which thereby shears off the flowing stream of glass and confines it to the passage 45 in the funnel 44 where it may accumulate while the gate is closed. Because of the engagement of the arm 98 with the pin 112 the arm 97 is moved in a clockwise direction by the arm 98, the circuit remaining completed during this simultaneous movement of the two arms. Ultimately the wrist pin 82 again reaches the highest position and the movement of the arm 98 ceases, but the wrist pin 91 has still some distance to travel before its highest point is reached, and the slotted member 125 participates in this movement until ultimately the lower end of the slotted member 125 is brought into engagement with the pin 122 and the arm 97 participates in this movement, while the arm 98 is beginning its counter-clockwise movement, so that the circuit is quickly broken in the manner already described, the break of the circuit being more rapid than the completion of the circuit. During the time that the two arms 97 and 98 are moving together in the clockwise direction, the gear teeth 74 become active to the proper group of gear teeth 71 and the table 68 is given a partial rotation sufficient to carry the charged mold from beneath the funnel 44 and the next mold in order to a position beneath the funnel, the parts being so proportioned that then the plain portion of the pinion 73 enters a socket portion 72 of the gear 70, thus locking the latter and the molds in the new position, so that another charge of glass may be deposited in the mold then in position to receive it, while a charged mold is subjected to the action of the plunger, and the latter is held for a sufficient length of time in the mold to insure the solidification of the glass article so formed. It will be observed that the glass from the tank is wholly cut off from the molds while the molds are being shifted, and that because of the accumulations of the molten glass within the funnel during this time, there is no chance whatsoever of any portion of the glass solidifying during this period.

The action of the machine is rapid and the alternate charging and discharging of the solenoid is liable to heat the latter to a comparatively high temperature, even high enough to be destructive. For this purpose, a chilling fluid is carried through the chamber exterior to the solenoid as already described.

It will be noticed that the passage 45 expands from the upper end toward the lower end and it is so made to facilitate the movement of the accumulated glass from the funnel to the mold.

The parts are arranged with the purpose in view of facilitating the operation and adjustments and repairs. The screws 22 and 23 permit the adjustment of the funnel to admit the use of molds of different heights and this is readily permitted since the connections between the reservoir of cooling medium and the parts to be cooled are flexible and the connections between the battery 42 and solenoid 28 are also flexible and yieldable to such adjustments as may be necessary. The arm 18 is of sufficient length to engage between the lugs 14 throughout the range of adjustment of the arm 12 along the stem 9, while the elongated slots 7 permit the placing of the passage 45 immediately beneath the flow hole 2 when the arm 12 is locked against swinging about the stud 9. The swinging of the arm 12 facilitates the repair or replacing of the funnel structure or the removal and replacing of the gate as may become necessary from time to time.

The operation of the structure is entirely automatic so far as the deposition of the glass into the molds and the shifting of the molds in order is concerned, while the flow of glass from the tank is continuous with no opportunity for the glass so continually flowing becoming chilled and thereby stopping the operation of the machine. The funnel acts as a supplemental reservoir storing the flowing glass during the intervals when the molds are being moved to carry away a charged mold from operative relation to the funnel and to bring the next mold in order into operative relation to the funnel.

The adjustments provided for the electrical controller allow for the setting of the structure so that the period of time during which the glass will flow to the molds may be controlled at will to accommodate the structure to different conditions, whereby the amount of glass deposited in each mold will be kept sensibly constant from time to time.

What is claimed is:—

1. An attachment for continuous flow glass tanks comprising a receptacle introducible into the path of the flow of glass issuing from the tank, between the latter and a mold, said receptacle having a constantly open receiving end for a non-interrupted flow of glass thereinto from the tank, a support for said receptacle provided with means for securing said support to the glass tank, and means carried by the support for intermittently opening the receptacle for the escape therefrom of accumulated glass.

2. An attachment for continuous flow glass tanks comprising a receptacle adapted to be introduced into the path of flow of glass from a tank, between the latter and a mold, said receptacle having a constantly open receiving end for a non-interrupted flow of glass thereinto from the tank, said receptacle having a bottom member carried by said receptacle and movable to open and close said receptacle, the movement of the bottom member being in shearing relation to said receptacle.

3. An attachment for continuous flow glass tanks comprising a receptacle adapted to be introduced into the path of flow of glass from a tank between the latter and a mold, said receptacle having a constantly open receiving end for a non-interrupted flow of glass thereinto from the tank and provided with a passage therethrough for the stream of glass, said passage widening toward the discharge end, a gate carried by the receptacle in shearing relation to the discharge end of the passage and constituting the bottom member of the receptacle, and supporting means for the receptacle adapted to be secured to the glass tank.

4. An attachment for continuous flow glass tanks comprising a receptacle adapted to be placed in the path of flow of glass from a tank, between the latter and a mold, said receptacle having a constantly open receiving end for a non-interrupted flow of glass thereinto from the tank, a supporting arm for said receptacle, a pivot support for the arm about which it is movable in a direction transverse to the direction of flow of the glass, said pivot support having means for the attachment thereof to the glass tank, and locking means carried by the pivot support for engaging and holding the arm in a position to maintain the receptacle in the path of the flowing glass.

5. An attachment for continuous flow glass tanks comprising a receptacle adapted to be placed in the path of the flowing glass, said receptacle carrying a gate in shearing relation to the discharge end of the receptacle, an arm for supporting the receptacle with the gate thereon, a pivot support for the arm having means for attaching it to a glass tank, means for adjustment of the arm on the pivot support in the direction of the length thereof, a lock carried by the pivot support for positioning the arm with the receptacle in the path of the flowing glass, and means carried by the arm for operating the gate.

6. An attachment for continuous flow glass tanks comprising a receptacle adapted to be placed in the path of flow of glass from a tank, a gate in shearing relation to and constituting the bottom member of the receptacle, said gate being carried by the receptacle, a support for the receptacle having means for attaching the same to the glass tank, said support being adjustable on the attaching means in a direction to move the receptacle toward and from the glass tank and also capable of being swung in a direction transverse to the direction of flow of glass from the tank, a lock for the support carried by the means for attaching the support to the glass tank, said lock holding the receptacle in the path of the flowing glass, and means carried by the support for causing the operation of the gate to close or open the lower end of the receptacle.

7. An attachment for continuous flow glass tanks comprising a receptacle adapted to be placed in the path of flow of the glass from the tank, a gate carried by the receptacle in shearing relation to the discharge end of the latter and constituting the bottom member for the receptacle, an arm carrying the receptacle at one end, a pivot support for the other end of the arm, said pivot support being provided with means for attaching the same to a glass tank, and adjustable about its longitudinal axis, means for the adjustment of the arm in the direction of the length of the pivot support, a lock member for the arm for positioning the receptacle with relation to the path of flow of glass, and means carried by the arm for causing the operation of the gate.

8. In an attachment for continuous flow glass tanks, a receptacle adapted to be interposed in the path of flow of glass from a tank between the latter and a mold, said receptacle having a constantly open receiving end for a non-interrupted flow of glass thereinto from the tank and having a passage therethrough for the flowing glass, and a gate pivoted to the receptacle to move in shearing relation to the discharge end of the passage to close and open the latter and also constituting the bottom member of the receptacle, said receptacle and gate having means for the passage therethrough of a cooling medium.

9. In an attachment for continuous flow glass tanks, a receptacle adapted to be placed in the path of flow of glass from a tank between the latter and a mold, said receptacle having a constantly open receiving end for a non-interrupted flow of glass thereinto from the tank and having a passage therethrough, a bottom member for the receptacle pivoted thereto and movable in shearing relation to the bottom of the passage, and electrically operated means connected to the bottom member for actuating the same.

10. In an attachment for continuous flow glass tanks, a receptacle having a passage therethrough and adapted to be placed with the passage in the line of flow of glass from a tank between the latter and a mold, the receiving end of said receptacle being constantly open for a non-interrupted flow of glass thereinto, a support for the receptacle, a gate carried by the receptacle and movable transversely of the longitudinal axis of the passage through the receptacle in shearing relation to the lower end of said passage, and electro-mechanical means for operating the gate.

11. An attachment for continuous flow glass tanks comprising a receptacle having a passage therethrough and adapted to be placed with the passage in the line of flow of glass from the tank, said receptacle having a bottom member in the form of a gate in shearing relation to the lower end of the passage therethrough, and electro-mechanical means for operating the gate, said electro-mechanical means comprising a solenoid, a core therefor, a stem carrying the core and projecting on opposite sides thereof, connections between one end of the stem and the gate, and a spring acting on the other end of the stem to move the same in opposition to the movement of the core under the action of the solenoid.

12. An attachment for continuous flow glass tanks comprising a receptacle having a passage therethrough and adapted to be placed with the passage in the line of flow of glass from the tank, said receptacle having a bottom member in the form of a gate in shearing relation to the lower end of the passage therethrough, and electro-mechanical means for operating the gate, said electro-mechanical means comprising a solenoid, a pivotal mounting therefor, a core for the solenoid, a stem for said core extending to opposite sides thereof, a bell crank lever and link connection between one end of the stem and the gate, and a spring on the other end of the stem acting thereon in opposition to the action of the solenoid on the core.

13. An attachment for continuous flow glass tanks comprising a receptacle having a passage therethrough and adapted to be placed with the passage in the line of flow of glass from the tank, said receptacle having a bottom member in the form of a gate in shearing relation to the lower end of the passage therethrough, and electro-mechanical means for operating the gate, said electro-mechanical means comprising a solenoid, a pivotal mounting therefor, a core for the solenoid, a stem for said core extending to opposite sides thereof, a bell crank lever and link connection between one end of the stem and the gate, and a spring on the other end of the stem acting thereon in opposition to the action of the solenoid on the core, the receptacle, gate and solenoid being provided with means for the passage of a cooling medium in operative relation thereto.

14. An attachment for glass tanks comprising a receptacle for glass adapted to be placed in the path of a stream of glass flowing from the tank, said receptacle having a discharge opening, a gate in shearing relation to the discharge opening and movable thereacross, electric means for moving the gate to and holding it in position to close the discharge opening of the receptacle, and a spring for moving the gate to the open position.

15. An attachment for glass tanks comprising a receptacle for glass issuing from the tank, said receptacle having a discharge opening, a gate movable into and out of operative relation to the discharge opening of the receptacle, electro-mechanical means for operating the gate, means for moving molds into and out of operative relation to the discharge end of the receptacle, and an electric controller adapted to operate in conjunction with the mold actuating means to energize the electric gate operating means in timed relation to the mold operating means.

16. In a glass molding means including a glass tank and a mold carrying member, a receptacle for glass issuing from the tank, a closure for said receptacle comprising a gate in shearing relation to the outlet of the receptacle and movable into and out of closing relation to the receptacle, electro-mechanical means for operating the gate, and a controller for the electro-mechanical means having connections to the mold operating means timed to cause the actuation of the electro-mechanical gate operating means when a mold is in operative relation to the receptacle.

17. An attachment for continuous flow glass tanks comprising a receptacle adapted to be placed in the path of flow of glass from the tank, said receptacle being provided with a movable bottom member, electrically operated means for actuating said bottom member, and an electric controlling means for said electrically operated means comprising a rockable member carrying contact terminals, circuit connections between the terminals and said electric operating means, another rockable member in operative relation to the first named rockable member and provided with a bridging means for the contact terminals, and actuating means for the rockable members for imparting to the latter rocking movements in predetermined timed relation.

18. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising a rockable member carrying contact terminals, circuit connections between said terminals and said electrically operated means, another rockable member in operative relation to the first named rockable member and provided with a bridging means for the contact terminals, an actuating means for the rockable members comprising a crank member, and separate connections therefrom to the rockable members, said connections extending from separated points of the crank member.

19. An attachment for continuous flow glass tanks comprising a receptacle adapted to be placed in the path of flow of glass from the tank, said receptacle having a movable bottom member, electrically operated means for actuating said bottom member, and electric controlling means for said electrically operated means comprising two rockable members one carrying contact terminals and the other a bridging means in operative relation to the contact terminals, circuit connections between the terminals and the said electrically operated means, a crank member, and independent connections from spaced points of the crank member to the respective rockable members, one of the connections being inactive to the respective rockable member during a portion of its movement.

20. An attachment for continuous flow glass tanks comprising a receptacle adapted to be placed in the path of flow of glass from the tank, said receptacle having a movable bottom member, electrically operated means for actuating said bottom member, and electric controlling means for said electrically operated means comprising two rockable members one carrying contact terminals and the other a bridging means in operative relation to said contact terminals, circuit connections between the contact terminals and said electrically operated means, a crank member, and independent connections from spaced points of the crank member to the respective rockable members, one of the connections being inactive to the respective rockable member during a portion of its movement, and connections between the two rockable members causing the actuation of one rockable member by the other while its actuating connection to the crank member is idle.

21. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising two rock arms, a common pivotal support therefor, contact terminals on one rock arm, bridging terminals therefor on the other rock arm, a stop member on one arm in the path of the other arm for causing the simultaneous movement of the arms in one direction, and circuit connections between the contact terminals and the electrically operated means.

22. An attachment for continuous flow glass tanks, comprising a receptacle adapted to be placed in the path of flow of glass from the tank, said receptacle being provided with a movable bottom member, electrically operated means for actuating said bottom member, and an electric controlling means for said electrically operated means comprising two rock arms, a common pivot support therefor, contact terminals on one rock arm, circuit connections between the contact terminals and the electrically operated means, bridging terminals on the other rock arm for the contact terminals, a stop member on one arm in the path of the other arm for causing the simultaneous movement of the arms in one direction, and a stop member in the path of the arm carrying the contact terminals for limiting the movement of said arm in one direction.

23. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising two rock arms, a common pivotal support therefor, contact terminals on one arm, circuit connections from said contact terminals to the electrically operated means, bridging terminals on the other rock arm for said contact terminals, a stop member on one arm in the path of the other arm for causing the simultaneous movement of the arms in one direction, a stop member in the path of the arm carrying the contact terminals for limiting the movement of said arm in one direction, and an adjustable means on the rock arm carrying the contact terminals positioned to engage the stop member limiting the extent of movement of said rock member in one direction.

24. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising two rock arms, a common pivot support therefor, a stop member on one arm in the path of the other arm, spaced terminal contact plates on one arm, circuit connections between said contact plates and the electrically operated means, a bridging means on the other arm adapted to engage the terminal contact plates, spaced crank members having the same axis of rotation, and connections between each crank member and a respective one of the rock members.

25. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising two rock arms, a common pivot support therefor, a stop member on one arm in the path of the other arm, spaced terminal contact plates on one arm, circuit connections between said plates and the electrically operated means, a bridging means on the other arm adapted to engage the terminal contact plates, spaced crank members having the same axis of rotation, and connections between each crank member and a respective one of the rock members, the crank members being also placed at different radial distances from the axis of rotation.

26. An attachment for continuous flow glass tanks comprising a receptacle adapted to be placed in the path of flow of glass from the tank, said receptacle having a movable bottom member, electrically operated means for actuating said bottom member, and an electric controlling means for said electrically operated means comprising two rock arms, a common pivot support, a stop member on one arm in the path of the other arm, spaced terminal contact plates on one arm, circuit connections between said plates and the electrically operated means, a bridging means on the other arm adapted to engage the terminal contact plates, spaced crank members having the same axis of rotation, and connections between each crank member and a respective one of the rock members, the crank members being also placed at different radial distances from the axis of rotation, and one of the connecting members being slotted where joined to the respective rock member for idle movement relative thereto.

27. An attachment for continuous flow glass tanks comprising a receptacle adapted to be placed in the path of flow of glass from the tank, said receptacle having a movable bottom member, electrically operated means for actuating said bottom member, and electric controlling means for the electrically operated means comprising circuit connections between the controlling means and the electrically operated means, two rock members, one carrying spaced circuit terminals and the other carrying bridging means therefor in operative relation to the said circuit terminals, the two rock members being movable about a common axis and one of the rock members having a normal tendency to move in one direction and provided with stop means in the path of the other rock member, and driving means for the rock members for imparting thereto different relative movements, the actuating means for the rock member with the normal tendency in one direction having an extent of idle movement relative thereto.

28. In an apparatus for the purpose described, a supplemental receptacle for receiving molten glass and discharging it at predetermined intervals, electro-mechanical means for causing the opening and closing of the discharge portion of the receptacle at such intervals, and a controller for the electro-mechanical actuating means adjustable as to the relative time of its operation to adapt the opening and closing of the receptacle to varying conditions.

In testimony, that I claim the foregoing as my own, I have hereto affixed my signature in the presence of two witnesses.

IRA HAZLETT FREESE.

Witnesses:
FRED L. SHINN,
ALMA SWIGER.